United States Patent Office 2,819,237
Patented Jan. 7, 1958

2,819,237

AQUEOUS DISPERSIONS OF A COPOLYMER OF AN ETHYLENICALLY UNSATURATED MONOMER CONTAINING A PRIMARY HYDROXY GROUP AND A THERMOSETTING RESIN FORMING REACTION PRODUCT

John H. Daniel, Jr., Stamford, Conn., assignor to American Cyanamid Company, New York, N. Y., a corporation of Maine No Drawing. Application September 22, 1953
Serial No. 381,730

20 Claims. (Cl. 260—29.4)

This invention relates to a novel composition of matter comprising a mixture of an aqueous emulsion of a latex copolymer of thermoplastic substance and an aqueous dispersion of a water dispersible, thermosetting resin forming reaction product. More particularly, this invention relates to a novel composition of matter in which the latex copolymer is the polymerized reaction product of a polymerizable compound containing a $CH_2=C<$ group and a primary hydroxy group, namely a $-CH_2OH$ group and a polymerizable compound containing a $CH_2=C<$ group but devoid of any hydroxy group.

One of the objects of the present invention is to produce a composition of matter, which will have application, particularly in the coatings field, comprising a mixture of an aqueous emulsion of a thermoplastic latex copolymer and an aqueous dispersion of a water dispersible, thermosetting resin-forming reaction product. A further object of the present invention is to produce a novel composition of matter which will be applied as a coating composition to surfaces such as metal, wood and the like and which when allowed to dry and when baked produces a coating which is hard, glossy and resistant to solvents and chemicals. These and other objects of the present invention will be discussed in greater detail hereinbelow.

In the preparation of the latex copolymer, one of the essential reactants is a polymerizable compound containing the polymerizable $CH_2=C<$ group and, in addition thereto, a primary hydroxy group, namely a $-CH_2OH$ group. Amongst these compounds are the hydroxy alkyl esters of the alpha, beta unsaturated carboxylic acids, the ortho, meta or para alkylol styrenes, the alkylol vinyl ethers, the alkylol ethers of allyl alcohol and the like. Illustrative of compounds which can be used in the preparation of the latex polymer are 2-hydroxy ethyl acrylate, 3-hydroxy propyl acrylate, 4-hydroxy butyl acrylate, 5-hydroxy amyl acrylate, 6-hydroxy hexyl acrylate, 7-hydroxy heptyl acrylate, 8-hydroxy octyl acrylate, 9-hydroxy nonyl acrylate, 10-hydroxy decyl acrylate, 2-hydroxy ethyl methacrylate, 4-hydroxy butyl methacrylate, 6-hydroxy hexyl methacrylate, 9-hydroxy nonyl methacrylate, 3-hydroxy propyl crotonate, 4-hydroxy butyl crotonate, 7-hydroxy heptyl crotonate, 10-hydroxy decyl crotonate, di(2-hydroxy ethyl) maleate, di(4-hydroxy butyl) maleate, di(6-hydroxy hexyl) maleate, di(8-hydroxy octyl) maleate, di(10-hydroxy decyl) maleate, di(2-hydroxy ethyl) fumarate, di(4-hydroxy butyl) fumarate, di(7-hydroxy heptyl) fumarate, di(9-hydroxy nonyl) fumarate, di(10-hydroxy decyl) fumarate, and the like. Additionally, one may use substituted hydroxy alkyl esters of the alpha, beta unsaturated carboxylic acids wherein the substituent is present on the alkyl chain, such as 3-chloro-4-hydroxy butyl acrylate, 4,4-dichloro-6-hydroxy hexyl acrylate, 3-nitro-8-hydroxy octyl acrylate, di(3-bromo-4-hydroxy butyl) maleate, di(4-hydroxy-6-chloro-8-hydroxy octyl) fumarate and the like. Additionally, one may use the alkylol acrylamides such as methylol acrylamide, ethylol acrylamide, methylol methacrylamide, ethylol methacrylamide, methylol ethacrylamide, ethylol ethacrylamide and the like. Still further, one may make use of the alkylol vinyl phenyl ethers such as ethylol vinyl phenyl ether and the like.

Additionally, one can use the ortho, meta or para ethylol ether of styrene, the ortho, meta or para 3-hydroxy propyl ether of styrene and the like. Still further, one could use the methylol ether of allyl alcohol, the ethylol ether of allyl alcohol, 3-hydroxy propyl ether of allyl alcoho and the like. These hydroxy containing polymerizable compounds can be used singly or in combination with one another.

Amongst the polymerizable compounds containing the $CH_2=C<$ group devoid of any hydroxy group which may be used in copolymerization with the hydroxy containing polymerizable monomers are the alkyl esters of alpha, beta unsaturated carboxylic acids such as ethyl acrylate, propyl acrylate, butyl acrylate, octyl acrylate, decyl acrylate, lauryl acrylate, ethyl methacrylate, butyl methacrylate, heptyl methacrylate, decyl methacrylate, propyl crotonate, butyl crotonate, nonyl crotonate, diethyl maleate, dibutyl maleate, dihexyl maleate, dibutyl fumarate, dinonyl fumarate, and the like. These esters may be used either singly or in combination with one another.

Additionally or alternatively, with respect to the compounds of the preceding paragraph, one may use as a polymerizable monomer in coreaction with the hydroxy compounds such polymerizable vinyl compounds as styrene, ortho, meta, para alkyl styrenes such as the ring substituted methyl, ethyl propyl and butyl styrenes, 2,4-dimethylstyrene, 2,3-dimethylstyrene, 2,5-dimethylstyrene, vinyl naphthalene, acrylonitrile, methacrylonitrile, halo ring or side chain styrenes such as alpha, chloro styrene, o-, m-, p-chlorostyrene, 2,4-dichlorostyrene, 2,3-dichlorostyrene, 2,5-dichlorostyrene or the alkyl side chain styrenes such as alpha, methyl styrene, alpha ethyl styrenes, and the like. Additionally, one could make use of the vinyl esters such as vinyl acetate, vinyl propionate and the like or the vinyl halides such as vinyl chloride, vinyl bromide and the like or the vinylidene halides such as vinylidene chloride and the like or the butadienes such as 1,3-butadiene and the like. These polymerizable monomers may be used either singly or in combination with one another in the preparation of the latex copolymers. The polymerizable compounds containing the $-CH_2OH$ group may be present in the latex polymer in 10% to 60% by weight based on the total weight of the copolymer. Reciprocally, the polymerizable compound devoid of a $-CH_2OH$ group may be present in an amount varying between about 90% and 40% by weight based on the total weight of the polymer solids in the latex. Preferably, the polymerizable compound containing the $-CH_2OH$ group is present in an amount varying between 20% and 40% by weight based on the total weight of polymer solids in the latex and reciprocally, the polymerizable compound devoid of the $-CH_2OH$ group may be present in an amount varying between about 80 and 60% by weight based on the total polymer solids in the latex.

Amongst the thermosetting resin forming reaction products which may be used in admixture with latex copolymers are the aldehyde reaction products of such aldehyde-reactable compounds as urea, ethyleneurea, dicyandiamide, phenols such as phenol per se, resorcinol, cresols, dimethyl phenols and the like; ketones such as acetone, methyl ethyl ketone, diethyl ketone and the like, amino-triazines, such as melamine, benzoguanamine, acetoguanamine, formoguanamine, ammelide, ammeline, 2,4,6-triethyl triamino-1,3,5-triazine, mono, di or tri aralkyl triamino triazines or mono, di or triaryl triamino triazines such as 2,4,6-triphenyl-triamino-1,3,5-triazine and the like. The aforegoing aldehyde-reactable compounds may be reacted with aldehydes such as formaldehyde, acetaldehyde, crotonic aldehyde, acrolein, benzaldehyde, furfuraldehyde and the like. The term "aldehydes" includes not only the aldehydes themselves but also compounds engendering aldehydes such as paraformaldehyde, paraldehyde, trioxymethylene and the like. The preferred aldehyde is formaldehyde and the preferred aldehyde reactable resin forming compounds are melamine and urea.

These thermosetting resin forming reaction products may be either non-alkylated or alcohol-modified but preferably those which are modified by coreaction with alcohols containing 1 to 2 carbon atoms, namely methanol and ethanol. The important characteristic of these thermosetting resin forming reaction products is that they be water dispersible and in an aqueous dispersion. The ratio of the thermosetting resin forming material to the latex polymer may be varied over a fairly wide range such as 10% to 90%, respectively, to about 90% to about 10% respectively, and preferably 20% to 80%, respectively, to 60% to 40%, respectively.

In the use of these thermosetting resin forming reaction products with the latex copolymers, it is not imperative that a catalyst be used, although it is greatly preferred for optimum results that a catalyst be used. The catalysts used may be any of the conventional catalytic materials many of which have been disclosed in the prior art and which are water soluble or at least water dispersible. The amounts of catalyst which may be used, obviously can be varied over a considerable range, as the prior art clearly teaches. Still further, the thermosetting resin forming reaction products may be produced by reacting the aldehydes with the aldehyde-reactable compounds in the conventional mol ratios such as for instance with the urea-formaldehyde resins, mol ratios of 1:1.5 to 1:4, respectively, in the instance of melamine-formaldehyde resins 1:1.5 to 1:6, respectively may be used.

The aqueous dispersion itself may be comprised of water alone or mixtures of water with minor amounts up to about 20% of aliphatic alcohols that are miscible therewith and preferably methanol and ethanol. It has been indicated hereinabove that the alcohol modified thermosetting resin forming reaction products are preferred as one of the components to the composition of the present invention.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

LATEX A 582 parts of water and 21 parts of a 25% solution of Aerosol OT (dioctyl sodium sulfosuccinate) in water are introduced into a suitable reaction vessel equipped with stirrer, thermometer, reflux condenser and a means of introducing the monomers and polymerization catalyst. While heating the water and emulsifier at reflux, there is added a mixture of 144 parts of 96.9% acrylonitrile, 144 parts of butyl acrylate, 70 parts of beta-hydroxyethyl methacrylate. Separately but concurrently there is added a mixture of 0.245 part of sodium bicarbonate and 0.35 part of ammonium persulfate dissolved in 39 parts of water. The monomer mixture and catalyst solution are added gradually over a period of 1½ hours to the emulsifier solution while at reflux. Heating is continued at reflux for an additional 2¾ hours at which time substantially all of the monomers are polymerized. By distilling to concentrate the emulsion, the small amount of residual monomeric material is stripped off and a higher solids latex is obtained.

COMPARATIVE LATEX B

Example 1 is repeated except in the place of the beta-hydroxy ethyl methacrylate, there is substituted an equal amount of ethyl acrylate.

Example 1

20 parts of a 50% aqueous solution of dimethoxy methyl urea containing 1 part of a 10% ammonium sulfate solution in water are blended thoroughly with 125 parts of the latex A. The blend is passed through cheese cloth in order to remove any coagulated material. Films on glass plates are prepared by spraying the above mixture of latex A and urea resin forming material and they are allowed to air dry. Other coatings of the same material are baked for 2 hours at 60° C. The films thus produced are transparent and bright, indicating good compatibility of the components.

Comparative Example 2

Example 1 is repeated except in the place of latex A there is substituted an equal amount of latex B. Films were prepared in a comparable manner as in Example 1 and when dried by air drying or baking, the resultant films are hazy and dull. This illustrates that the hydroxy group present in the latex A brings about compatibility with the urea resin forming material as in Example 1.

Coatings prepared with latices similar to those described in Example 1, show outstanding properties and are particularly suited as wood coatings. When compared to the best, current types of furniture finishes, e. g., alkyd-plasticized nitrocellulose lacquers and alkyd-plasticized urea resins, deposited from solvent systems, the finish of the present invention was superior in color, toughness, cold check resistance, solvents and chemical resistance, amongst other superior characteristics. Because of the light color of this type of resin and the excellent color retention upon ageing, the finish of the present invention is particularly recommended for blonde and bleached woods.

Example 3

A methylated trimethylol melamine resin syrup (80% solids) is prepared and the pH is adjusted to 9 by the addition of a small amount of dilute ammonium hydroxide. 2% by weight of 2-amino, 2-methyl-propanol-1 hydrochloride catalyst (30% solution in water) is added. 6.3 parts of the catalyzed methylated melamine resin thus prepared is mixed with 60 parts of latex A (35% solids). Films were drawn down from this mixture on wood and the films were baked for 2 hours at 140° F. The films thus obtained were hard and clear.

LATEX C

Into a suitable reaction chamber equipped as in latex A, there are introduced 602 parts of water and 5.25 parts of dioctyl sodium sulfosuccinate. The emulsifier and water solution are heated gradually to reflux. While at reflux, a mixture of 140 parts styrene, 108 parts of butyl acrylate and 105 parts of beta-hydroxyethyl methacrylate is added gradually. Concurrently but separately a mixture of 0.245 part of sodium acid carbonate and 0.35 part of ammonium persulfate in 39 parts water is added gradually over a period of about 1½ hours while the reaction mixture is at reflux. After the addition of the monomers is complete, heating is continued for about an additional 2¾ hours until substantially all of the monomers are polymerized. The emulsion is distilled to remove any residual monomeric material and in order to provide a latex having a higher solids content.

Example 4

Blends of latex C and a water soluble partially methylated dimethylol urea containing 0.25% by weight of HCl based on the amino resin solids. Films prepared therefrom were baked for 2 minutes at 150° C. to produce hard, glossy films which showed excellent toughness in addition to solvent and chemical resistance.

PHENOL-FORMALDEHYDE CONDENSATE

A water soluble phenol-formaldehyde condensation product is prepared by charging into a suitable reaction vessel, 70 parts of phenol, 70 parts of a 37% aqueous formaldehyde solution, 3.5 parts of glycerol and 2.1 parts of potassium hydroxide. The mixture is heated at about 65–70° C. for about 1 hour, whereupon 23.5 parts of water at 50–55° C. is added. The heating is continued for 40 minutes at 65–70° C., the resulting product showed complete miscibility with water.

Example 5

The phenol-formaldehyde condensation product, produced as hereinabove, is diluted to a solids content of 16⅔% by the addition of water. 2 parts of latex A is added to 1 part of the diluted phenolic condensate. After thoroughly mixing, a film is drawn down on a glass plate and allowed to air dry and finally baked for 30 minutes, at 150° C., to give a hard, clear film.

Example 6

A mixture of 1 part of dimethylol urea, 1 part of water and 1 part of a latex tripolymer solids prepared from styrene, butyl acrylate and hydroxy ethyl methacrylate (30:50:20, respectively) of 35% solids content was prepared. Equal parts by weight of dimethylol urea and the latex solids are employed. The mixture is heated for 1 hour at 80° C. in order to polymerize partially the dimethylol urea and thus prevent its crystallization from the mixture upon cooling.

Films deposited from this blend are baked for 85 minutes at 150° C. The films thus produced are hard and glossy.

Example 7

A 50% solids syrup of a methylated trimethylol melamine resin forming material is admixed with latex C in the ratios of 1 part of melamine syrup to 4 parts of the latex. A second mixture was prepared using 1 part of the melamine syrup and 2 parts of the latex C. All amounts being expressed on the basis of solids content of the mixed material. Films therefrom were applied to wood and to glass. After baking the films for 2 hours at 60° C. and 3 minutes at 120° C., clear, hard films were obtained in all cases.

LATEX D

An emulsion copolymer prepared from 70 parts of butyl acrylate and 30 parts of beta hydroxy ethyl methacrylate is prepared at a 35% solids basis by the procedure described in latex A.

Example 8

A partially methylated dimethylol urea reaction product is prepared and 1% by weight of ammonium sulfate is added to a 50% solids solution of the resin forming reaction product. 1.25 parts of this resin forming reaction product are added slowly with stirring to 11.4 parts of latex D. Films drawn down from this reaction mixture on glass were glossy and clear when baked.

Example 9

A 25% solids solution of bis(ethoxymethyl)urea is mixed with 1% of ammonium sulfate by weight. The catalyzed urea resin forming material was blended with latex A in the ratios of 1 part of the former to 2 parts of the latex both on a solids basis. Thin films of the blend, after baking for 20 minutes at 120° C. were clear, bright and flexible.

In the preparation of the latex emulsions, one can make use of the conventional wetting agents or emulsifying agents such as dioctyl sodium sulfosuccinate, dihexyl sodium sulfosuccinate, diamyl sodium sulfosuccinate, diisobutyl sodium sulfosuccinate, isopropyl naphthalene sodium sulfonate, sodium lauryl sulfate and the like. Reference is made to the U. S. Patent 2,038,091 for further details regarding these wetting agents. I have found that stable emulsions of hydroxycontaining copolymers may readily be prepared by employing small amounts of these anionic emulsifying agents. Although non-ionic emulsifying agents may be used in conjunction with the anionic emulsifying agents, they have not been found to be necessary. It is not necessary to utilize protective colloids in forming the latex. The amount of emulsifier and protective colloid used in the latex should preferably be kept at a minimum since the presence of undue amounts of these materials detract from the water resistance of the finished dried film.

The particle size of the dispersed phase of the emulsion is not critical. Of course, it is known that too large a particle size in the dispersed phase of the emulsion adversely effects the stability of the emulsion, whereas a particle size which is too small would result in a high viscosity, which in turn renders the emulsion less desirable. Although the particle size of the dispersed phase of the emulsion may be varied over fairly wide limits such as between about 0.05 micron to about 5 microns, optimum results are realized when the particle size of the dispersed phase of the emulsion is between about 0.1 and 0.5 micron.

If too high an electrolyte concentration is allowed to come in contact with the latex emulsion, there is the risk of causing partial or complete coagulation of the solid particles in the emulsion. Because of this fact, it is preferred to add the catalyzed, water-soluble thermosetting resin forming material to the latex emulsion gradually while the emulsion is being stirred. In this manner, coagulation can be minimized ar avoided entirely.

In order to prepare clear finishes for wood, the blends of the latex and thermosetting resin forming material may, if desired, be admixed with water soluble stains. These finishes, after a moderate baking period, may be readily rubbed according to the methods employed in the wood finishing art, in order to give a finish with a high uniform gloss. If so desired, pigments may be used in the composition of the present invention.

In addition to the latex emulsions used in the composition of the present invention, one can make use of aqueous emulsions of other resinous materials such as emulsions of alkyd resins, more particularly oil modified alkyd resins, styrene-butadiene emulsions, styrene-acrylonitrile emulsions, acrylonitrile-butadiene emulsions or the acrylate emulsions such as the methyl, ethyl, propyl and butyl acrylate emulsions.

I claim:

1. A composition of matter comprising a mixture of from about 10% to about 90% by weight of (1) an aqueous emulsion of latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, benzoguanamine, acetoguanamine, formoguanamine, ammelide, ammeline, 2,4,6-triethyl-triamino-1,3,5-triazine and 2,4,6-triphenyl-triamino-1,3,5-triazine.

2. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group, (c) a polymerizable compound different from (b) containing a CH$_2$=C< group but devoid of any hydroxy group and from about 90% to about 10% by weight of (2) an aqueous dispersion of a water dispersible, fusible, thermosetting resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, bezoguanamine, acetoguanamine, formoguanamine, ammelide, ammeline, 2,4,6-triethyl-triamino-1,3,5-triazine and 2,4,6- triphenyl-triamino-1,3,5-triazine 3. A composition of matter comprising a mixture of from about 10% to about 90% by weight of (1) an aqueous emulsion of a latex copolymer of from about 10% to about 60% by weight of (a) a member selected from the group consisting of a polymerizable compound containing —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting aminoplast resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, benzoguanamine, acetoguanamine, formoguanamine, ammelide, ammeline, 2,4,6-triethyl-triamino-1,3,5-triazine and 2,4,6-triphenyl-triamino-1,3,5-triazine.

4. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting aminotriazine-aldehyde resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, benzoguanamine, acetoguanamine, formoguanamine, ammelide, ammeline, 2,4,6-triethyl-triamino-1,3,5-triazine and 2,4,6-triphenyl-triamino-1,3,5-triazine.

5. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting melamine-formaldehyde resin forming reaction product.

6. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting urea-formaldehyde resin forming reaction product.

7. A composition of matter comprising a mixture of from about 10% to about 90% by weight of (1) an aqueous emulsion of a latex copolymer of from about 10% to about 60% by weight of (a) a hydroxy alkyl ester of an alpha, beta unsaturated carboxylic acid and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, benzoguanamine, acetoguanamine, formoguanamine, ammelide, ammeline, 2,4,6-triethyl-triamino-1,3,5-triazine and 2,4,6-triphenyl-triamino-1,3,5-triazine.

8. A composition of matter comprising a mixture of from about 10% to about 90% by weight of (1) an aqueous emulsion of a latex copolymer of from about 10% to about 60% by weight of (a) a hydroxy alkyl ester of an alpha, beta unsaturated carboxylic acid and from about 90% to about 40% by weight of (b) a polymerizable compound containing a CH$_2$=C< group but devoid of any hydroxy group and (2) an aqueous dispersion of a water dispersible, fusible, thermosetting melamine-formaldehyde resin forming reaction product.

9. A composition of matter comprising a mixture of from about 10% to about 90% by weight of (1) an aqueous emulsion of a latex copolymer of from about 10% to about 60% by weight of (a) a hydroxy alkyl ester of an alpha, beta unsaturated carboxylic acid and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting urea-formaldehyde resin forming reaction product.

10. A composition of matter comprising a mixture of from about 10% to about 90% by weight of (1) an aqueous emulsion of a latex copolymer of from about 10% to about 60% by weight of (a) a hydroxy alkyl ester of an alpha, beta unsaturated carboxylic acid and from about 90% to about 40% by weight of (b) an alkyl ester of an alpha, beta unsaturated carboxylic acid devoid of any hydroxy group and from about 90% to about 10% by weight of (2) an aqueous dispersion of a water dispersible, fusible, thermosetting melamine-formaldehyde resin forming reaction product.

11. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting alcohol-modified melamine-formaldehyde resin forming reaction product.

12. A composition of matter comprising a mixture of from about 10% to about 90% by weight of (1) an aqueous emulsion of a latex copolymer of from about 10% to about 60% by weight of (a) a hydroxy alkyl ester of an alpha, beta unsaturated carboxylic acid and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting alcohol-modified melamine-formaldehyde resin forming reaction product.

13. A composition of matter comprising a mixture of from about 10% to about 90% by weight of (1) an aqueous emulsion of a latex copolymer of from about 10% to about 60% by weight of (a) a member selected from the group consisting of a polymerizable compound containing a —CH=CH— group and a —CH$_2$OH group and a polymerizable compound containing a CH$_2$=C< group and —CH$_2$OH and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting alcohol-modified urea-formaldehyde resin forming reaction product.

14. A composition of matter comprising a mixture of from about 10% to about 90% by weight of (1) an aqueous emulsion of a latex copolymer of from about 10% to about 60% by weight of (a) an hydroxy alkyl ester of an alpha, beta unsaturated carboxylic acid and from about 90% to about 40% by weihgt of (b) a polymerizable compound containing a CH$_2$=C< group but devoid of any hydroxy group and from about 90% to about 10% by weight of (2) an aqueous dispersion of a water dispersible, fusible, thermosetting alcohol-modified urea-formaldehyde resin forming reaction product.

15. A composition of matter comprising a mixture of from about 10% to about 90% by weight of (1) an aqueous emulsion of a latex copolymer of from about 10% to about 60% by weight of (a) beta hydroxy ethyl methacrylate and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting resin forming reaction product wherein said thermosetting resin forming reaction product is the reaction product of an aldehyde and a compound selected from the group consisting of urea, ethyleneurea, dicyandiamide, phenol, resorcinol, cresol, acetone, methyl ethyl ketone, diethyl ketone, melamine, benzoguanamine, acetoguanamine, formoguanamine, ammelide, ammeline, 2,4,6-triethyl-triamino-1,3,5-triazine and 2,4,6-triphenyl-triamino-1,3,5-triazine.

16. A composition of matter comprising a mixture of from about 10% to about 90% by weight of (1) an aqueous emulsion of a latex copolymer of from about 10% to about 60% by weight of (a) beta hydroxy ethyl methacrylate and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermometting melamine-formaldehyde resin forming reaction product.

17. A composition of matter comprising a mixture of from about 10% to about 90% by weight of (1) an aqueous emulsion of a latex copolymer of from about 10% to about 60% by weight of (a) beta hydroxy ethyl methacrylate and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting urea-formaldehyde resin forming reaction product.

18. A composition of matter comprising a mixture of from about 10% to about 90% by weight of (1) an aqueous emulsion of a latex copolymer of from about 10% to about 60% by weight of (a) a beta hydroxy ethyl methacrylate and from about 90% to about 40% by weight of (b) a polymerizable compound containing a CH$_2$=C< group but devoid of any hydroxy group and from about 90% to about 10% by weight of (2) an aqueous dispersion of a water dispersible, fusible, thermosetting alcohol-modified melamine-formaldehyde resin forming reaction product.

19. A composition of matter comprising a mixture of from about 10% to about 90% by weight of (1) an aqueous emulsion of a latex copolymer of from about 10% to about 60% by weight of (a) a beta hydroxy ethyl methacrylate and from about 90% to about 40% by weight of (b) an alkyl ester of an alpha, beta unsaturated carboxylic acid devoid of any hydroxy group, and from about 90% to about 10% by weight of (2) an aqueous dispersion of a water dispersible, fusible, thermosetting alcohol-modified melamine-formaldehyde resin forming reaction product.

20. A composition of matter comprising a mixture of from about 10% to about 90% by weight of (1) an aqueous emulsion of a latex copolymer of from about 10% to about 60% by weight of (a) a beta hydroxy ethyl methacrylate and from about 90% to about 40% by weight of (b) an alkyl ester of an alpha, beta unsaturated carboxylic acid devoid of any hydroxy group, and from about 90% to about 10% by weight of (2) an aqueous dispersion of a water dispersible, fusible, thermosetting alcohol-modified urea-formaldehyde resin forming reaction product.

References Cited in the file of this patent

UNITED STATES PATENTS

| | | |
|---|---|---|
| 2,470,757 | Bobalek | May 24, 1949 |
| 2,536,050 | Fluck | Jan. 2, 1951 |
| 2,624,722 | Kropa et al. | Jan. 6, 1953 |
| 2,681,897 | Frazier et al. | June 22, 1954 |

FOREIGN PATENTS

| | | |
|---|---|---|
| 628,150 | Great Britain | Aug. 23, 1949 |

U. S. DEPARTMENT OF COMMERCE
PATENT OFFICE

CERTIFICATE OF CORRECTION

Patent No. 2,819,237                                 January 7, 1958

John H. Daniel, Jr.

It is hereby certified that error appears in the printed specification of the above numbered patent requiring correction and that the said Letters Patent should read as corrected below.

Column 2, line 13, for "alcoho" read -- alcohol --; column 6, line 41, for "ar" read -- or --; line 61, after "aqueous emulsion of" insert -- a --; column 8, line 49, after "hydroxy group and" insert -- from about 90% to about 10% by weight of --; column 9, line 46, for "weihgt" read -- weight --; column 10, line 12, for "metting" read -- setting --.

Signed and sealed this 11th day of March 1958.

(SEAL)
Attest:

KARL H. AXLINE                                                        ROBERT C. WATSON
Attesting Officer                                           Commissioner of Patents